July 6, 1965 G. C. TRIPLETT 3,193,625

DIAL TELEPHONE NUMBER PLATE COVER

Filed April 9, 1962

INVENTOR.
GEORGE C. TRIPLETT

BY
Mead, Browne, Schuyler, & Beveridge
ATTORNEYS.

United States Patent Office 3,193,625
Patented July 6, 1965

3,193,625

DIAL TELEPHONE NUMBER PLATE COVER

George Childers Triplett, Atlanta, Ga., assignor to Gladwin Plastics, Inc., Atlanta, Ga., a corporation of Georgia Filed Apr. 9, 1962, Ser. No. 186,044
5 Claims. (Cl. 179—90)

This invention relates to dial telephone number plates, and more particularly to a cover member or assembly adapted for cooperative employment with existing number plates for the purpose of modifying the number plate code.

It is a primary object of the present invention to provide a cover member device for the number plates of dial telephones constructed and arranged in a fashion such that the coded symbols on the number plate may be modified as desired.

It is another object of the invention to provide a dial telephone number plate cover assembly which may be readily installed in the field.

The foregoing, and other objects, are achieved in a telephone number plate cover constructed of relatively thin sheet material, such as a transparent or clear plastic material for example, which is complementary in shape to the upper or front surface of the conventional dial telephone number plate. The cover member itself may be embossed or printed, or in the case of opaque cover member, with suitable code indicia for providing the number plate with a code differing from the presently employed standard code. In instances where the cover member is formed from a clear or transparent plastic material, the modified code indicia may be printed on an annular symbol ring of paper or other material, preferably provided with an adhesive coating by means of which the symbol ring may be secured either to the upper surface of the telephone number plate or to the under surface of the transparent cover member. The cover member, like the number plate, is formed with a circular central opening which permits free passage of the rotatable parts of the dial mechanism. It is readily installed merely by temporarily detaching the front housing and the finger wheel of the dial mechanism which is secured to its shaft by a nut readily accessible to the installer.

Other objects and features of the invention will become apparent by reference to the following specification and to the drawings.

Figures 2, 3:
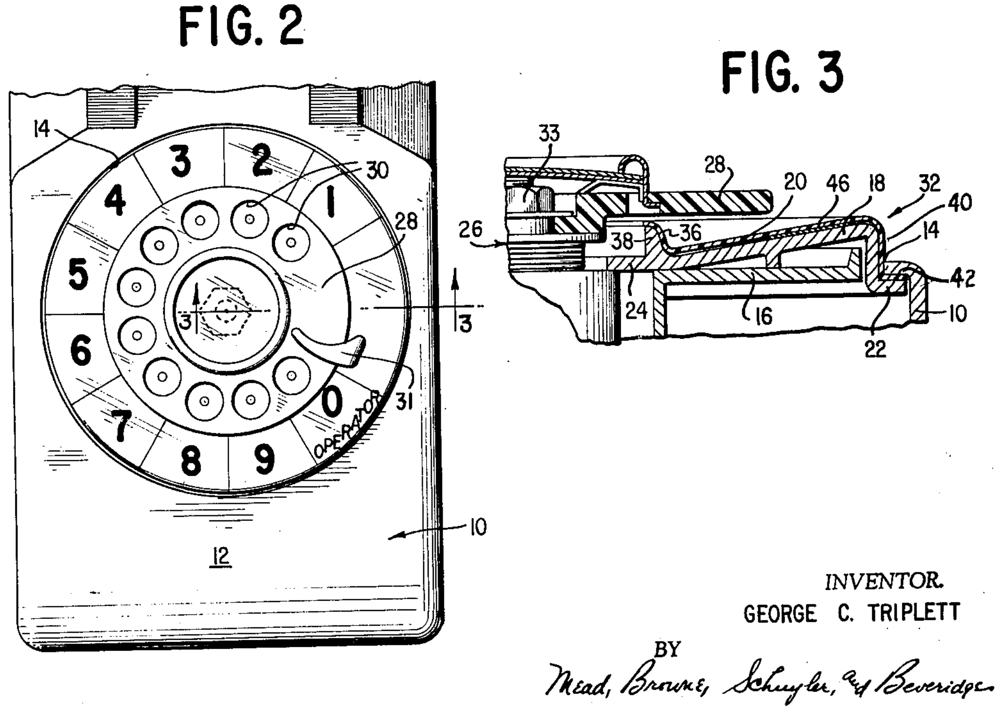
FIG. 2 is a top plan view showing a portion of a dial telephone with the cover member of FIG. 1 in place.
FIG. 3 is a detail cross-sectional view taken on line 3—3 of FIG. 2.

Referring first to FIGS. 2 and 3, there are shown portions of a conventional desk type dial telephone which includes the outer housing designated generally 10 having a front wall 12 which is formed with a circular opening 14 adapted to operatively receive certain portions of the conventional dialing mechanism. Referring to FIG. 3, the dial mechanism includes a stationary casing member 16 fixedly mounted within housing 10 by conventional means, not shown, upon which is fixedly mounted as by screws, not shown, an annular number plate 18. As best seen in FIG. 3, number plate 18 is constructed with an upwardly and outwardly inclined conical surface 20 which terminates at its outer periphery in an L-shaped flange 22 which is so dimensioned as to underlie front wall 12 of housing 10 around the periphery of opening 14. Number plate 18 thus projects somewhat from the front surface of front wall 12 and is received within opening 14.

Number plate 18 is formed with a central opening defined by flange 24 through which projects the rotatable portions of the dialing mechanism indicated generally at 26. The rotatable portions of the dialing mechanism include the familiar dial ring or finger wheel 28 which, as seen in FIG. 2, is provided with a series of finger receiving openings 30. As best seen in FIG. 3, finger wheel 28 is supported for rotation in spaced overlying relationship above number plate 18, the outer diameter of finger wheel 28 being substantially less than the outer diameter of number plate 18. Finger wheel 28 is detachably secured to the rotatable portions of the dialing mechanism by a nut 33. A stationary finger stop 31 is mounted upon the stationary portions of the dial mechanism to project into operative relationship with finger wheel 28.

The structure described thus far is that of a conventional dial telephone and has been set forth for the purpose of clearly describing the manner in which the structure of the present invention is cooperatively interrelated with the conventional dial telephone structure.

Figure 1:
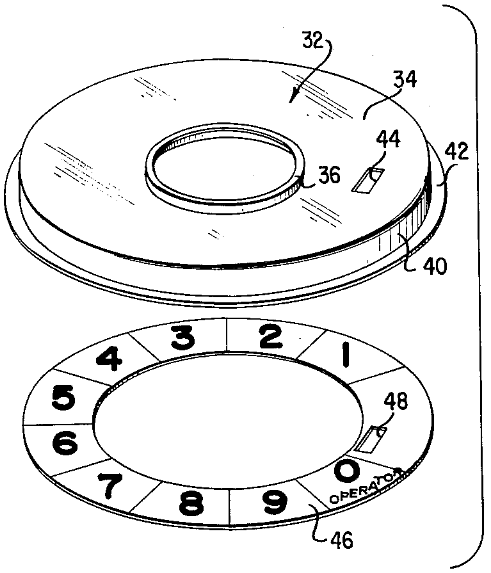
FIG. 1 is an exploded perspective view showing one form of cover member embodying the invention.

Referring now particularly to FIGS. 1 and 3, a number plate cover member designated generally 32 is formed from a sheet of relatively thin transparent material. Cover member 32 is in the shape of an annular member whose main body portion 34 is in the shape of a frusto conical annulus complementary in shape to the upper or front surface 20 of number plate 18. Around the inner periphery of annulus 34, an upstanding flange 36 is formed which is complementary in shape to an annular flange 38 on number plate 18. An L-shaped flange 40 extends around the outer periphery of annulus 34 and is complementary in shape to the L-shaped flange 22 on number plate 18.

As best seen in FIG. 3, the cross-sectional configuration of cover plate 32 is complementary in shape to and is adapted to be fitted in overlying relationship onto the upper surface of number plate 18 with flanges 36 and 40 of cover member 32 respectively being seated upon flanges 38 and 22 of number plate 18. The radially outwardly projecting lip 42 of flange 40 is so dimensioned, as best seen in FIG. 3, to project outwardly into underlying relationship with front wall 12 of the telephone housing when cover member 32 is mounted upon number plate 18.

An opening 44 is formed in annulus 34 to provide a passage for the vertical post upon which finger stop 31 is mounted. This post, not shown in detail since it is of well known construction, passes downwardly from finger stop 31 to number plate 18, and is fixedly mounted on its lower end upon casing 16.

In the usual case, cover member 32 functions to secure and to protect a coded symbol ring 46 which is adapted to overlie and conceal the conventional codes presently engraved on number plate 18. The symbol ring 46 shown in FIG. 1 is one designed to convert the present combined letter and number dialing code to the all number dialing code now being introduced. A finger stop post receiving opening 48 formed in the symbol ring is adapted to receive the vertical post of finger stop 31 to orient symbol ring 46 circumferentially of number plate 18. The overall appearance of the transparent cover member 32 of FIG. 1 in assembled relationship with symbol ring 46 is shown in FIG. 2 from which it is apparent that symbol ring 46 provides an easily readable all number dialing code. Preferably, symbol ring 46 will have one of its major surfaces coated with a pressure or moisture sensitive adhesive material so that symbol ring 46 may be adhesively secured either directly to number plate 18 or to the inner surface of annulus 34 of cover member 32. In either case, cover member 32 serves to protect symbol ring 46.

Obviously, codes other than the all number code shown in FIGS. 1 and 2 may be employed on the symbol ring. In cases where cover member 32 is constructed from an opaque material, the modified code indicia may be applied directly to the cover member.

Figure 4:
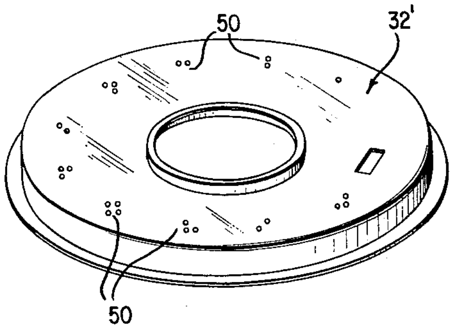
FIG. 4 is a perspective view of another form of cover member embodying the invention.

In FIG. 4, a modified form of the invention is disclosed wherein a cover member 32', substantially identical in construction to the cover member 32 of FIG. 1 is provided with a series of raised projections as at 50. In the specific instance of FIG. 4, the projections 50 are arranged to constitute a Braille equivalent of the all number symbol ring 46 of FIG. 1. The cooperative relationship of the cover member 32' of FIG. 4 to number plate 18 is otherwise the same as that of the embodiment shown in FIGS. 1 through 3.

Either form of cover member described above is readily installed without requiring the telephone to be removed from service. To install either form of cover member, housing 10 is removed from the frame of the telephone, and finger wheel 28 is temporarily detached from the dialing mechanism by the removal of nut 33 which is readily exposed by the removal of the central cap of the finger wheel. In the case where a printed symbol ring such as 46 is to be adhesively secured to number plate 18, the symbol ring is placed upon the number plate by passing finger stop 31 through opening 48 in the symbol ring. After the symbol ring is in place, the cover member is fitted over the number plate and symbol ring by passing the finger stop through the opening 44 in the cover member. The finger wheel is then replaced and housing 10 is fitted back onto the telephone frame and secured. With housing 10 replaced, the cover member is secured in position by virtue of the underlying relationship of lip 42 on the cover member relative to the inner surface of front wall 12 of the housing.

From the foregoing, it can be seen that the present invention provides an extremely economical and efficient means for modifying the dialing code of a telephone number plate. It is believed apparent that the manufacturing cost of either of the two forms of invention disclosed is substantially less than the cost which would be incurred in the manufacture of a conventional replacement number plate. Because the present invention may be installed on an existing telephone without the necessity of removing the existing number plate, it is also believed apparent that the time and effort necessary to install the present invention is much less than that which would be required to remove and replace an existing number plate.

While two specific embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

I claim:

1. For use in combination with a dial telephone of the type comprising a housing having a front wall, said front wall having a circular dial receiving opening therethrough, an annular symbol dial mounted in said housing and received within said opening, a rotatable dialing ring operatively mounted in overlying relationship to the central portion of said dial, and a stationary finger stop cooperatively associated with said dialing ring; an annular cover member of sheet material having an inner surface complementary in shape to and adapted to overlie the front surface of said symbol dial, means on said cover member for circumferentially locating said cover member relative to said dial, and means on said cover member adapted to project inwardly through said opening in said front wall of said housing to secure said cover member to said symbol dial, said last named means including an annular lip portion projecting beneath said housing front wall and retained by said front wall to maintain said cover member in overlying relation to said symbol dial.

2. A cover member as defined in claim 1 formed of transparent sheet material, and including an annular ring of indicia carrying material adapted to be located between the inner surface of said cover member and the front surface of said symbol dial.

3. For use in combination with a dial telephone of the type comprising a housing having a front wall, said front wall having a circular dial receiving opening therethrough, an annular symbol dial mounted in said housing and received within said opening, a rotatable dialing ring operatively mounted in overlying relationship to the central portion of said dial, and a stationary finger stop cooperatively associated with said dialing ring; an annular cover member of sheet material having an inner surface complementary in shape to and adapted to overlie the front surface of said symbol dial, said cover member having an opening therethrough adapted to receive said finger stop to circumferentially locate said cover member relative to said dial, and peripheral flange means on said cover member adapted to project inwardly through said opening in said front wall of said housing and radially outwardly into underlying engagement with the inner surface of said front wall to secure said cover member to said symbol dial.

4. In combination with a dial telephone having a front wall, a circular dial receiving opening in the front wall, an annular symbol dial mounted in said housing and received within said opening and having an annular flange projecting radially outwardly in underlying relationship with portions of said front wall surrounding said opening, and a stationary finger stop extending above said dial to be co-operable with a dialing ring; an annular cover for the dial positioned in superposed relationship over said dial and having an opening receiving said finger stop to circumferentially locate said cover member relative to said dial, said cover member including a peripheral flange projecting through said opening in said front wall and radially outwardly between said portions of said front wall and said flange of the dial to secure said cover member on the dial.

5. The combination defined in claim 4 wherein said dial and said cover are similarly concave and frusto conical in shape such that the cover is in conforming engagement with said dial.

References Cited by the Examiner

UNITED STATES PATENTS

| | | | |
|---|---|---|---|
| 1,850,550 | 3/32 | Johnson | 179—90 |
| 2,198,935 | 4/40 | Dormont | 179—90 |
| 2,563,581 | 8/51 | Clarke et al. | 179—90 |
| 2,656,628 | 10/53 | Ravin | 179—90 |
| 2,754,370 | 7/56 | Gauvreau | 179—90 |
| 2,808,668 | 10/57 | Christin | 179—90 |

ROBERT H. ROSE, *Primary Examiner.*